(12) United States Patent
Nishimura et al.

(10) Patent No.: US 6,801,692 B2
(45) Date of Patent: Oct. 5, 2004

(54) OPTICAL COUPLING STRUCTURE

(75) Inventors: Kosuke Nishimura, Saitama (JP); Masashi Usami, Saitama (JP); Hidenori Takahashi, Saitama (JP)

(73) Assignee: KDDI Corporation, Tokyo (JP)

( * ) Notice: Subject to any disclaimer, the term of this patent is extended or adjusted under 35 U.S.C. 154(b) by 214 days.

(21) Appl. No.: 10/067,552

(22) Filed: Feb. 4, 2002

(65) Prior Publication Data

US 2002/0106159 A1 Aug. 8, 2002

(30) Foreign Application Priority Data

Feb. 6, 2001 (JP) .......................................... 2001-029521

(51) Int. Cl.[7] .................................................. G02B 6/30
(52) U.S. Cl. ............................................ 385/49; 385/43
(58) Field of Search .................................... 385/49, 43

(56) References Cited

U.S. PATENT DOCUMENTS 5,515,464 A * 5/1996 Sheem .......................... 385/49
5,985,685 A * 11/1999 Lealman et al. ............... 438/31
6,229,947 B1 * 5/2001 Vawter et al. ................ 385/132
6,345,138 B1 * 2/2002 Kawai et al. .................. 385/49

* cited by examiner

Primary Examiner—Akm Enayet Ullah
Assistant Examiner—Jerry T Rahll
(74) Attorney, Agent, or Firm—Christie, Parker & Hale, LLP

(57) ABSTRACT

An object of this invention is to improve coupling efficiency of a silica optical waveguide having a high relative refractive index difference and a single mode optical fiber. A silica optical waveguide (10) consists of a single mode optical waveguide, and its core (12) is originally a rectangle. A width of the core (12) of the silica optical waveguide (10) is tapered at a predetermined length part (16) connecting to an optical fiber (20). A thickness of the core (12) in the tapered part (16) is constant.

8 Claims, 5 Drawing Sheets

OPTICAL COUPLING STRUCTURE

CROSS-REFERENCE TO RELATED APPLICATION

This application claims priority of Japanese patent Application No. 2001-029521, filed on Feb. 6, 2001.

FIELD OF THE INVENTION

This invention relates to an optical coupling structure to optically couple an optical circuit and an optical fiber, and more specifically to an optical coupling structure to optically couple a single mode plane optical waveguide and a single mode optical fiber.

BACKGROUND OF THE INVENTION

Recently, wavelength division multiplexing (WDM) optical transmission systems have rapidly developed that are capable of increasing transmission capacity by transmitting a plurality of optical signals each having a different wavelength in a single optical fiber simultaneously.

With the advance of the WDM optical transmission system, there is a big demand for optical devices to multiplex/demultiplex optical signals each having a different wavelength, for instance, a WDM multiplexer/demultiplexer to multiplex or demultiplex two signals each having a different wavelength and an arrayed waveguide grating (AWG) to multiplex or demultiplex optical signals with several tens of wavelengths at a time.

Those optical devices are mainly realized using silica optical waveguides. In an optical transmission system of an intermediate or longer haul, a single mode silica optical fiber which is capable of transmitting optical signals at low loss is used as a transmission line. It is for this reason that both the silica optical waveguide and the silica optical fiber are made of the same quartz materials and therefore can be optically coupled at low loss by direct connection.

Generally, mode field diameters (MFD) of a single mode fiber (SMF) which is widely used for optical transmission systems and a dispersion shifted fiber (DSF) which is also widely used similarly to the single mode fiber are both approximately $9.5 \pm 1$ $\mu$m.

To reduce the coupling loss with such optical fibers, it is considered that a waveguide parameter of the silica optical waveguide should be approximately equal to that of the optical fiber. That is, it is considered preferable if the relative refractive index difference $\Delta$ between a core and clad of the silica optical waveguide is approximately 0.3%, a shape of the core is a square approximately 8 $\mu$m on a side, and the MFD is almost identical to that of the optical fiber, namely approximately 9.5 $\mu$m.

On the other hand, the relative refractive index difference $\Delta$ tends to increase due to the demand for miniaturization. The silica optical waveguide devices such as the WDM multiplexer/demultiplexer and AWG are composed of curved waveguides. The curve loss of the curved waveguide increases as a curvature radius decreases. By increasing the relative refractive index difference $\Delta$, entrapment of the light intensifies and therefore the curve loss hardly increases even if the curvature radius is reduced. That is, increasing the relative refractive index difference $\Delta$ can reduce the device area.

When the number of the multiplexed wavelengths becomes more than 32 in an AWG which needs a large area, it is difficult to realize a desired AWG device in a conventional 4-inch diameter substrate even if the relative refractive index difference $\Delta$ is set to a little larger value of approximately 0.6%. When a waveguide having an even larger relative refractive index difference $\Delta$ of approximately 1.5%, namely a silica optical waveguide having a high $\Delta$ is used, it is possible to house an AWG with 64 wavelengths in an approximately 4-inch diameter substrate.

As stated above, a MFD of a silica optical waveguide with a larger relative refractive index difference (is as small as 5 $\mu$m and accordingly the coupling loss with a silica optical fiber becomes larger. To solve the above reciprocal relation between the curve loss and the coupling loss, a method has been proposed that reduces the refractive index of a core of a silica waveguide in the coupling part with an optical fiber and at the same time enlarges a core diameter. This method is called a thermally expanded core (TEC) method. In essence, after connecting a silica optical waveguide and a silica optical fiber, a core of the silica optical waveguide near to the connecting part is locally heated with an ultraviolet laser or the like to diffuse the elements doped to the core of the silica optical waveguide. Accordingly, in the area near to the connecting part of the silica optical waveguide, the refractive index of the core reduces and the core diameter enlarges causing the increase of the MFD and the decrease of the coupling loss.

In another method, when patterning of the core of the silica optical waveguide is performed using a photolithography method, the core width of the silica optical waveguide only in the part near to the connecting point is extended so that a MFD of the basic mode approximates to that of the silica optical fiber.

In the TEC method, it is necessary to locally heat at least once per connecting part of the silica optical waveguide and silica optical fiber. In an optical device having a large number of connecting parts like an AWG, the number of the local heating process increases and naturally this is quite troublesome. Furthermore, in this method, once a connecting part is excessively heated, it is impossible to repair the part anymore.

In a conventional system to extend a core width, it is possible to perform a batch forming through patterning of the core. However, the silica optical waveguide becomes a multi mode waveguide in the connecting part, namely the part in which the core diameter is extended and therefore it is unavoidable that a high-order lateral mode generates. The optical signals converted to the high-order mode either cannot or minimally couple with the single mode silica optical fiber and accordingly the coupling efficiency of those optical signals decreases.

SUMMARY OF THE INVENTION

It is therefore an object of the present invention to provide an optical connecting structure capable of forming a plurality of connecting parts in one operation and realizing a high coupling efficiency.

Another object of the present invention is to provide an optical coupling structure to optically couple a silica optical waveguide having a high relative refractive index difference $\Delta$ with a single mode optical fiber at a high efficiency.

An optical coupling structure to connect an optical fiber and a plane optical waveguide according to the invention consists of a core having same cross-sectional dimensions as a core cross sectional dimensions of the plane optical waveguide at one side connecting to the plane optical waveguide and having width and depth smaller than a core diameter of the optical fiber at the other side connecting to the optical fiber and clad to surround the core. At least one of width and depth of the core is tapered along optical axis as near to the other side.

A plane optical circuit to optically connect to optical fiber at a side surface of the plane optical circuit according to the invention consists of a core having a first refractive index, at least one of width and depth of the core being tapered along optical axis in a part near to the side surface, the width and the depth of the core at the side surface being smaller than a core diameter of the optical fiber and clad having second refractive index smaller than the first refractive index to surround the core.

The above configurations make it possible to optically couple the plane optical waveguide and the optical fiber at a high efficiency. It is sufficient as far as at least one of the width and depth of the core is tapered as it approaches to the optical fiber, and therefore it is relatively easy to form the structure. It is especially easy to taper the width of the core as it approaches to the optical fiber. In addition, this structure reduces costs because even if a large number of optical coupling parts are required, it is possible to perform all the tapering in one operation.

These configurations are more effective when the optical waveguide consisting of the core and the clad is a single mode optical waveguide and the optical fiber consists of a single mode optical fiber.

Even if the relative refractive index difference (between the core and clad is larger than that of the optical fiber, the taper configuration functions to approximate both propagation constants so that the optical coupling is performed easier. Consequently, it enables the use of plane optical waveguides having a high hand the ability to make the optical devices utilizing such waveguides more compact.

BRIEF DESCRIPTION OF THE DRAWING

The above and other objects, features and advantages of the present invention will be apparent from the following detailed description of the preferred embodiments of the invention in conjunction with the accompanying drawings, in which.

DESCRIPTION OF THE PREFERRED EMBODIMENT

Embodiments of the invention are explained below in detail with reference to the drawings.

Figure 1:
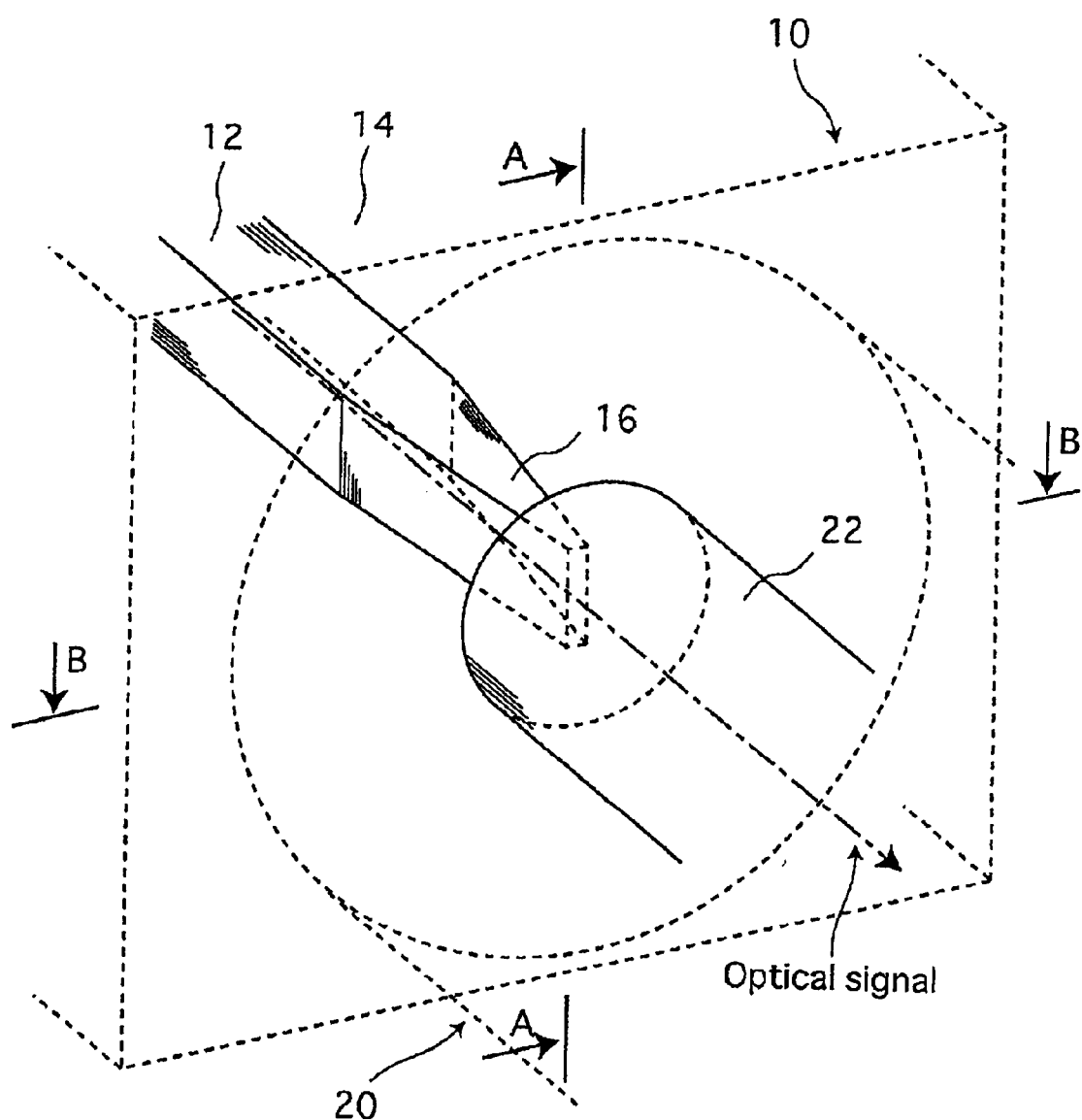
FIG. 1 shows a perspective view of the main elements of an embodiment according to the invention.

FIG. 1 shows a perspective view of main elements of an embodiment according to the invention. FIG. 2(A) shows a sectional view (central sectional view) taken on line A—A of the embodiment in FIG. 1 and FIG. 2(B) shows a sectional view (cross sectional view) taken on line B—B of the embodiment in FIG. 1. To make it more understandable, a core part of the waveguide is illustrated as solid lines and the rest are illustrated as broken lines in FIG. 1.

A core 12 of a silica optical waveguide 10 is originally a rectangle of 4.5 $\mu$m in depth and width, and a core 22 of a silica fiber 20 is 9 $\mu$m in diameter. In this embodiment, both silica optical waveguide 10 and optical fiber 20 consist of a single mode optical waveguide. The refractive index of the core 12 of the silica optical waveguide 10 is 1.4657 and that of a clad 14 is 1.4440. Accordingly, the relative refractive index difference $\Delta$ is approximately 1.5%. The refractive index of the core 22 of the silica optical fiber 20 is 1.4488 and that of a clad 24 is 1.4440. Accordingly, the relative refractive index difference $\Delta$ is approximately 0.33%.

The core 12 of the silica waveguide 10 and the core 22 of the silica optical fiber 20 meet at the side of the silica optical waveguide 10. In this embodiment, the width of the core 12 of the silica optical waveguide 10 tapers in the longitudinal direction at a part 16 of approximately 1000 $\mu$m connecting to the optical fiber 20 as shown in FIG. 2(B). The tapered part 16 keeps a constant core depth thickness as shown in FIG. 2(A). The tip width of the core 12 is 0.5 $\mu$m for example. Such a tapered form of the core 12 can be easily obtained using a photolithograph method when the core 12 is formed on a quartz substrate.

A field diameter of an optical signal propagating on the silica optical waveguide 10 becomes smaller as it transmits on the tapered part 16. FIGS. 3(A) through (F) depict field distributions in width and depth directions of each part of the silica optical waveguide 10 respectively. It is obvious from FIGS. 3(A) through (F) that the field diameter becomes extremely smaller in width direction. FIGS. 3(A) through (C) depict a field distribution in the depth direction respectively, and FIGS. 3(D) through (F) depict a field distribution of the width direction respectively. The vertical axis expresses relative optical intensity and the horizontal axis expresses relative values of distance.

Figure 4:
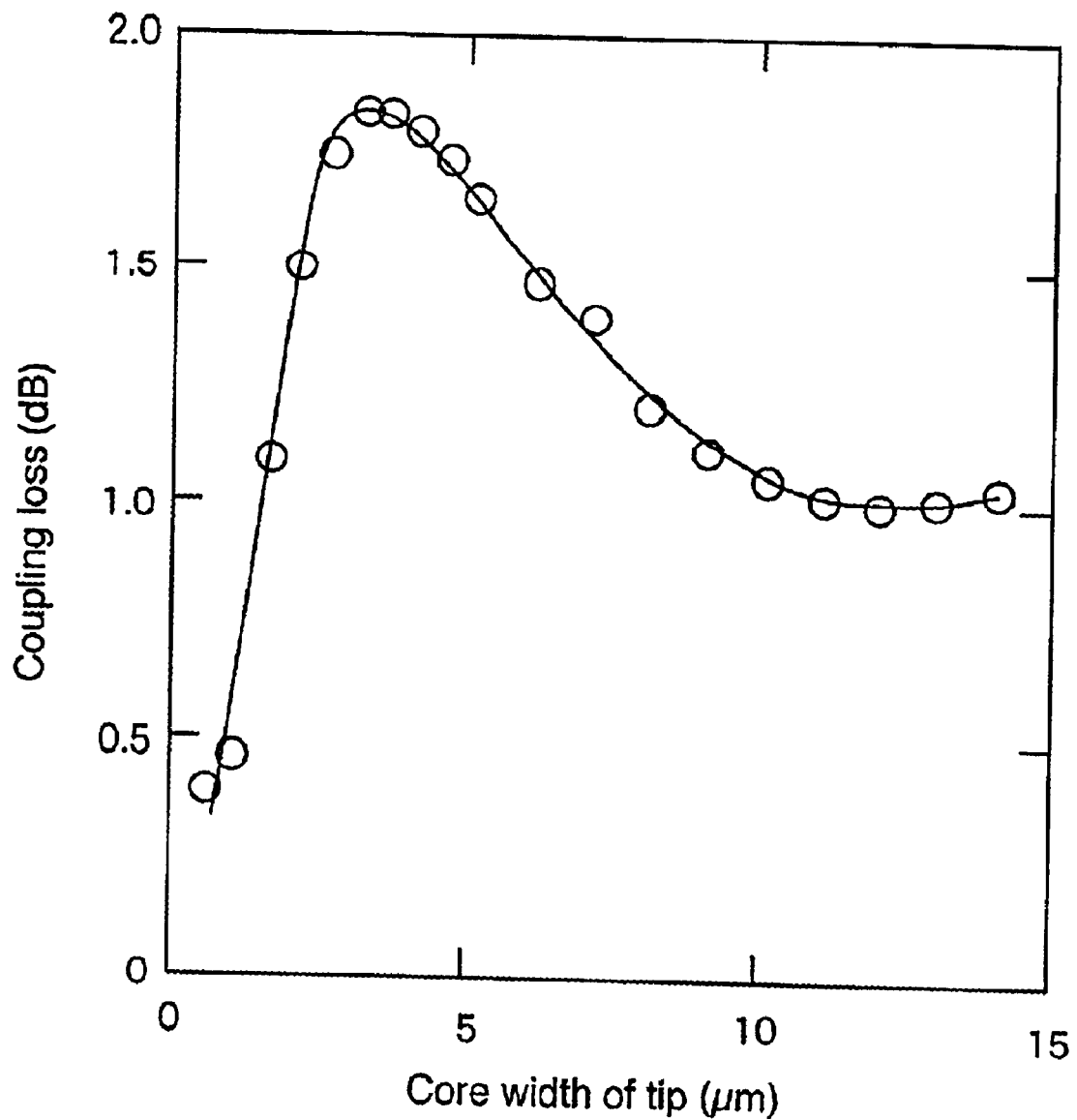
FIG. 4 shows a measured example of the coupling loss according to this embodiment.

FIG. 4 shows coupling loss of the core 12 and the optical fiber 20 of TE mode when the tip width of the core 12 is varied. The horizontal axis expresses the width of the tip part of the core 12 and the vertical axis expresses the coupling loss. Understandably, it is preferable to have the smallest coupling loss. It is obvious from FIG. 4 that the coupling loss reduces as the tip width of the core 12 narrows, and even a coupling loss as low as 0.5 dB or less can be easily realized.

In FIG. 4, when the tip width of the core 12 is around 12 $\mu$m, the coupling loss becomes the minimum. The coupling loss is 1.02 dB, namely the loss is 20.9%. This equals to the minimum value of coupling loss obtained through a high-order mode conversion of a conventional system to enlarge a core diameter. Moreover, the coupling loss decreases even more when the tip width of the core 12 narrows to 2 $\mu$m or less. The coupling loss especially decreases as low as 0.40 dB, namely the loss is 8.8% when the tip width narrows to 0.5 $\mu$m or less. However, if the tip width of the core 12 narrows any further than 0.5 $\mu$m, it easily causes distortion and failure of the tip at the etching process, and thus the formation using patterning would become difficult. Accordingly, the minimum coupling loss is substantially 0.40 dB. Needless to say, if the tip width of the core 12 can be narrower as the manufacturing technique improves, there is a possibility that the coupling loss might become even lower.

Figure 3:
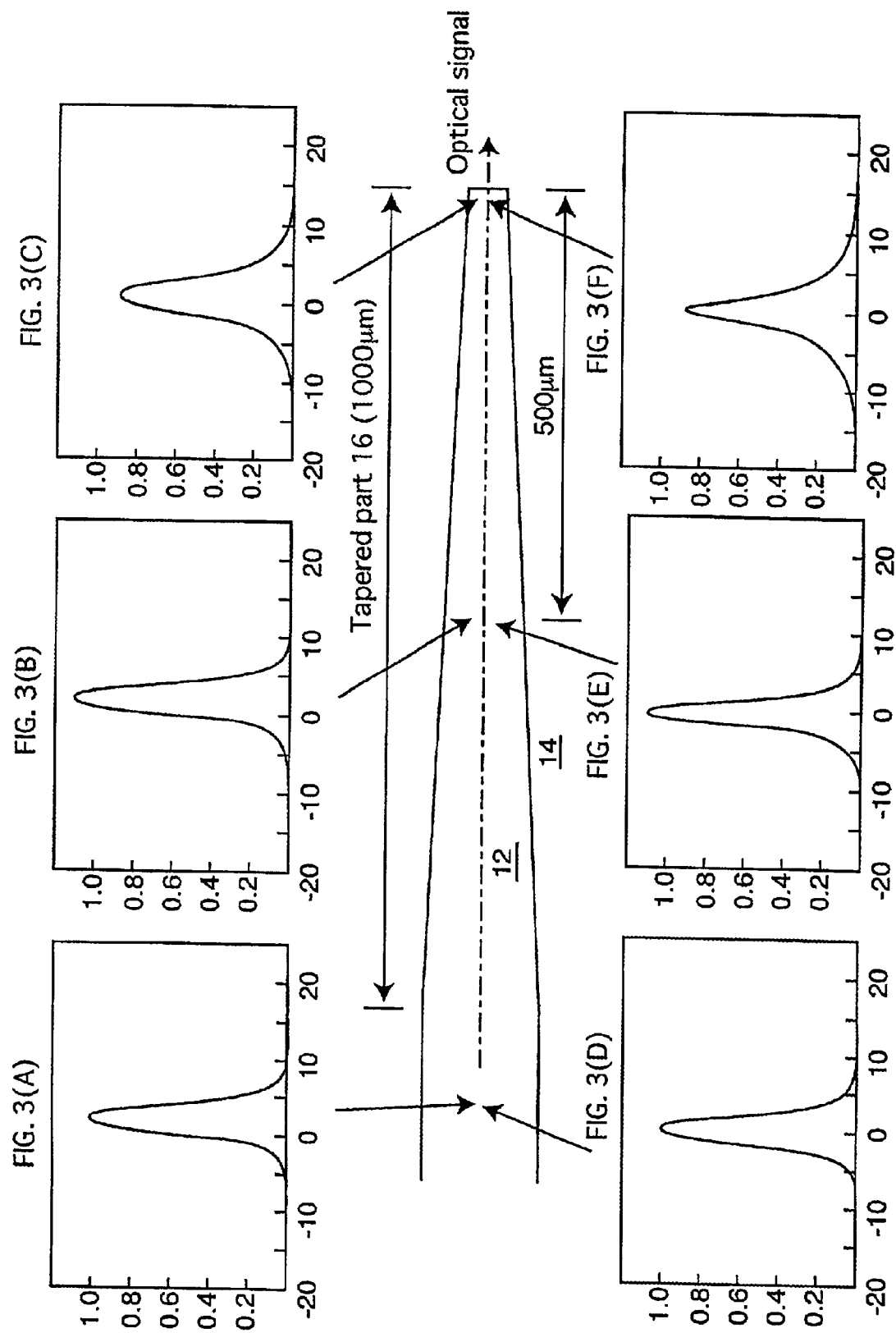
FIGS. 3(A)–(F) are schematic diagrams showing variations of field distribution of an optical waveguide 10 in the width and depth directions.

In the core 12 which width and depth are constant, light propagates in a single mode with a mode field diameter of approximately 5 µm. In the tapered part 16, since the width of the core 12 gradually narrows, the light also gradually converts to a radiation mode. Because the length of the taper part 16 is sufficient long as 1000 µm, the conversion from the fundamental guided mode to the radiation mode is adiabatically performed, and the loss due to the mode conversion becomes extremely low. The radiation mode is not shut in the core 12 and accordingly its MFD gradually increases. As shown in FIG. 3, although field patterns of the propagation light indicate slight differences between the width and thickness directions, both keep the forms that roughly approximate a Gaussian distribution. At the tip of the tapered part 16, the average value of the MFD in the width and thickness directions becomes approximately 9.0 µm, which is close to the MFD (approximately 9.5 µm) of the optical fiber 20. The shape of the tapered part 16 is symmetrical relative to an optical axis. Therefore, the propagating direction of the radiation mode equals that of the guided mode, and the propagating direction of the light does not change even after almost all the light is shifted to the radiation mode. Such are the reasons why the coupling loss decreases when the tip width of the core 12 is extremely narrowed as shown in FIG. 4.

That is, when the tip width of the core 12 is made even smaller, the light propagating the core 12 is finally launched as the radiation mode toward the outside. Generally, since the side face of the silica optical waveguide 10 is tightly connected to the end face of the optical fiber 20 and also in view of the measured results shown in FIG. 4, assumably it does not increase the coupling loss with the optical fiber 20.

Figure 2:
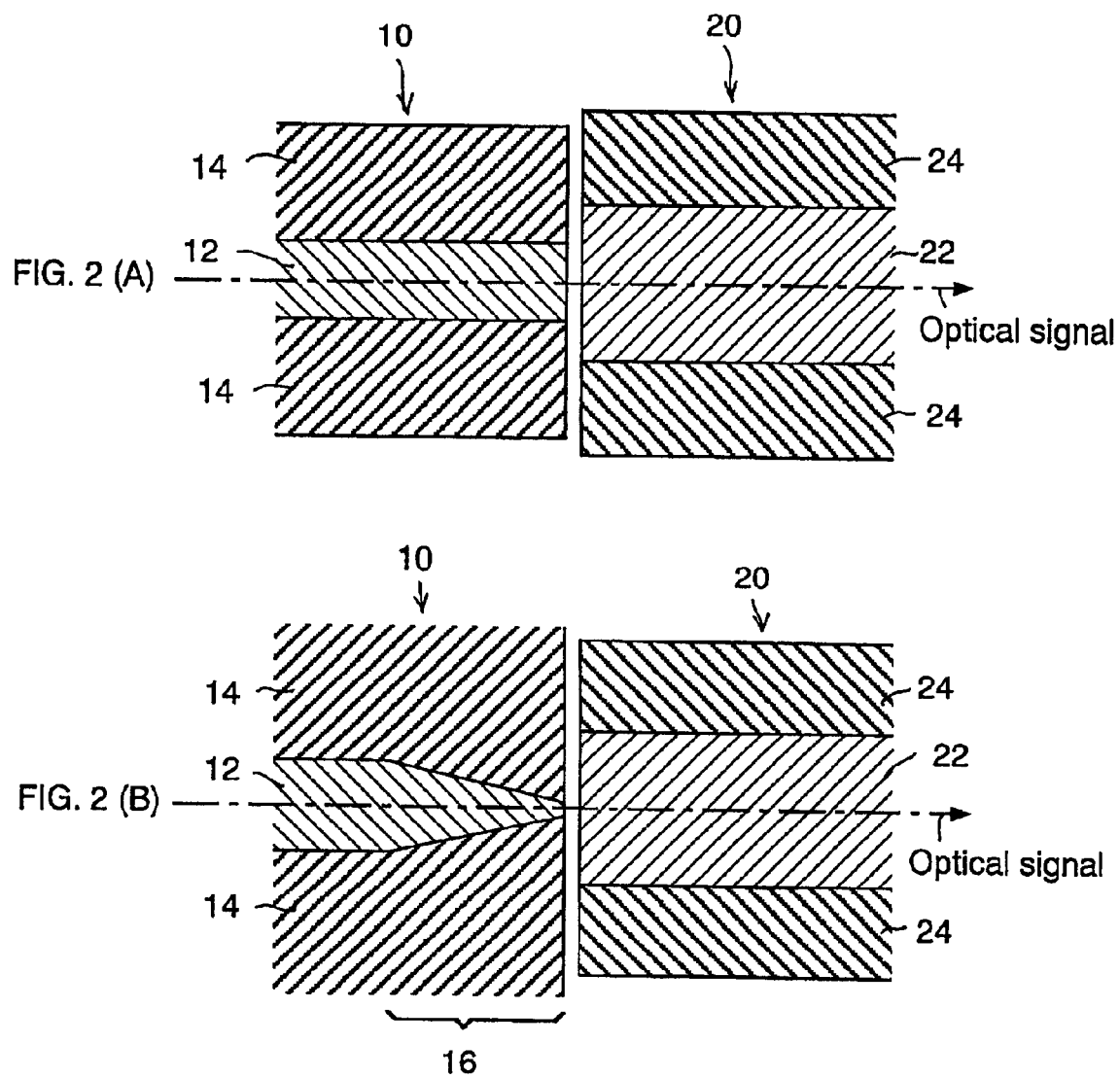
FIG. 2(A) shows a longitudinal sectional view taken on line A—A of the embodiment in FIG. 1
FIG. 2(B) shows a cross sectional view taken on line B—B of the embodiment in FIG. 1.
Figure 5:
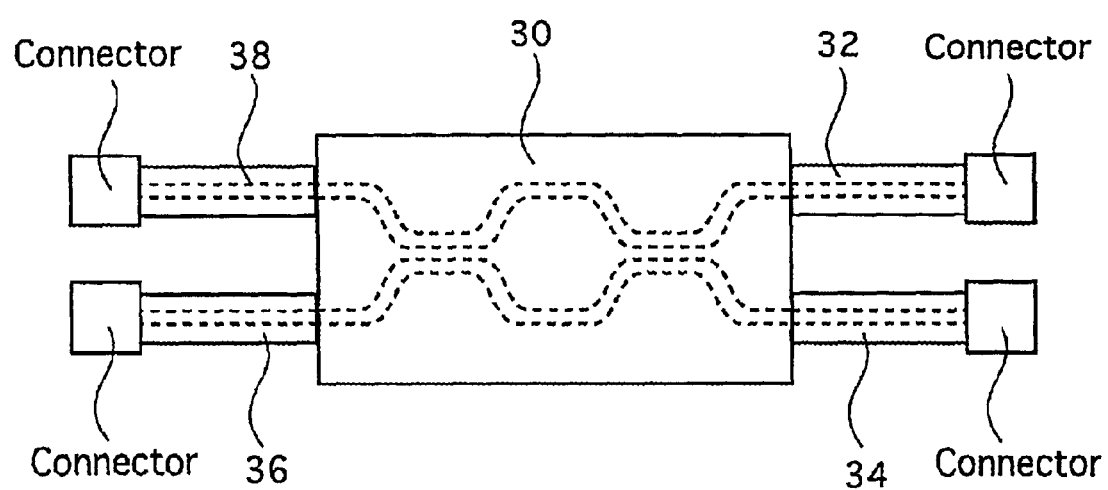
FIG. 5 shows a plan view when this embodiment is applied to the optical coupling of a plane optical circuit composed of an asymmetry Mach Zehnder interferometer and an optical fiber.

FIG. 5 shows a plan view when this embodiment is applied to the optical coupling of a plane optical circuit composed of asymmetry Mach-Zehnder interferometer having paths of different optical path lengths and an optical fiber. Reference numeral 30 denotes a plane optical circuit made of mainly quartz on a quartz substrate and connected to optical fibers 32 and 34 at one end face and to optical fibers 36 and 38 at the other end face. A part near to the end face of a core of the plane optical circuit 30 is shaped to a tapered form as shown in FIGS. 1 and 2.

It is obvious that this embodiment is applicable to an input and output of an arrayed waveguide grating besides the interference plane optical circuit 30 shown in FIG. 5. In an optical circuit module to connect a silica optical waveguide that needs large area such as an AWG and a large number of silica optical fibers, this embodiment exhibits even greater effectiveness. In addition, this embodiment is applicable to a multi-layer plane optical circuit in which plane optical circuits are layered.

In this embodiment, it is possible to launch light from a plane optical waveguide having a high Δ to a single mode optical fiber at a high coupling efficiency.

As readily understandable from the aforementioned explanation, according to the invention, it is possible to launch light from a plane optical waveguide to a single mode optical fiber at a high coupling efficiency using a very simple configuration.

By narrowing a core of a plane optical waveguide in the cross direction, namely in the plane of a plane optical circuit, it is easy to taper a tip part of the core of the plane optical waveguide.

Even though the relative refractive index difference of the plane optical waveguide is larger than that of the optical fiber, the tapered configuration functions to approximate both mode field diameters to make the optical coupling easy. Accordingly, a plane optical waveguide having a high Δ can be used, and thus it is possible to make an optical device to utilize it compact.

While the invention has been described with reference to the specific embodiment, it will be apparent to those skilled in the art that various changes and modifications can be made to the specific embodiment without departing from the spirit and scope of the invention as defined in the claims.

What is claimed is:

1. An optical coupling structure to connect an optical fiber and a plane optical waveguide, comprising:

a core having same cross-sectional dimensions as core cross sectional dimensions of the plane optical waveguide at one side connecting to the plane optical waveguide, and having width and depth smaller than a core diameter of the optical fiber at a fiber interface side connecting to the optical fiber wherein at least one of width and depth of the core is tapered along an optical axis proximate to the fiber interface side; and, clad to surround the core.

2. The optical coupling structure according to claim 1 wherein the width of the core is tapered along the optical axis proximate to the fiber interface side.

3. The optical coupling structure according to claim 1 wherein the plane optical waveguide is a single mode optical waveguide and the optical fiber is a single mode optical fiber.

4. The optical coupling structure according to claim 1 wherein a refractive index difference between the core and the clad is larger than that of the optical fiber.

5. The optical coupling structure according to claim 1 wherein each of the core and clad comprises a silica and the optical fiber comprises a silica optical fiber.

6. A plane optical circuit to optically connect to optical fiber at a side surface of the plane optical circuit, comprising:

a core having a first refractive index, at least one of width and depth of the core being tapered along optical axis in a part proximate to the side surface, the width and the depth of the core at the side surface being smaller than a core diameter of the optical fiber; and, clad having second refractive index smaller than the first refractive index to surround the core.

7. The plane optical circuit according to claim 6 wherein the width of the core is tapered along an optical axis in the part proximate to the side surface.

8. The plane optical circuit according to claim 6 wherein a refractive index difference between the core and the clad is larger than that of the optical fiber.

* * * * *